US005404974A

United States Patent [19]

Thum et al.

[11] Patent Number: 5,404,974

[45] Date of Patent: Apr. 11, 1995

[54] IMPACT-ABSORBING TRANSVERSE SUPPORT ARRANGEMENT

[75] Inventors: Holger M. Thum, Braunschweig; Wolfgang Lange, Wolfsburg, both of Germany

[73] Assignee: Volkswagen AG, Wolfsburg, Germany

[21] Appl. No.: 32,972

[22] Filed: Mar. 18, 1993

[30] Foreign Application Priority Data

Mar. 25, 1992 [DE] Germany ........................ 42 09 634.0

[51] Int. Cl.[6] ................................................ F16F 7/12

[52] U.S. Cl. .................................... 188/372; 293/110; 293/122

[58] Field of Search ................... 188/279, 298, 321.11, 188/322.19, 371, 372, 377; 267/217, 219, 292, 120, 64.11, 64.27, 139, 140, 154; 248/562, 566, 636; 293/107, 108, 132, 134, 136, 110, 120, 122, 109; 297/216; 280/751, 752, 728, 733, 805; 114/364; 405/212; 264/176.1, 177.14, 173, 177.1

[56] References Cited

U.S. PATENT DOCUMENTS

| | | | |
|---|---|---|---|
| 3,203,723 | 8/1965 | Montenare | 293/110 |
| 4,088,357 | 5/1978 | Klie | 293/122 |
| 4,413,856 | 11/1983 | McMahan | 293/110 |
| 4,883,299 | 11/1989 | Bonar | 293/110 |
| 4,893,834 | 1/1990 | Honda et al. | 280/751 |
| 4,940,270 | 7/1990 | Yamazaki | 293/132 |
| 5,078,439 | 1/1992 | Terada | 293/122 |
| 5,123,988 | 6/1992 | Iwasa | 264/177.1 |

*Primary Examiner*—Robert J. Oberleitner
*Assistant Examiner*—Clifford T. Bartz
*Attorney, Agent, or Firm*—Brumbaugh, Graves, Donohue & Raymond

[57] ABSTRACT

A transverse support arrangement, consisting of two support sections extending parallel to one another, both of which have closed cross-sections and a common wall, is made in one piece as an extruded member and, in addition, is designed so that, upon impact, a conversion of energy is effected by reverse deformation of a support section.

5 Claims, 1 Drawing Sheet

F
2
6
3
9

IMPACT-ABSORBING TRANSVERSE SUPPORT ARRANGEMENT

BACKGROUND OF THE INVENTION

This invention relates to impact-absorbing transverse support arrangements, for example, of the type used to absorb collision-generated impact forces in motor vehicles.

Transverse support arrangements for absorbing impact forces are generally designed to absorb forces applied in a direction transverse to the longitudinal extent of the member. Accordingly, in the preferred application of the invention, i.e., the absorption of collision-generated impact forces in motor vehicles, this transverse support arrangement may constitute a component of a shock absorber, a knee bar, a sill, a door column, a ramming buffer or any other transverse support arrangement which, in the event of a collision, is subject to impact forces produced by an external object or by the inertia of passengers in the vehicle.

Particularly in the preferred application of the invention, it is important that the transverse support arrangement is not simply preserved upon the occurrence of impact forces, but that it is capable of converting the kinetic energy of the impact forces into deformation work. In other words, the transverse support arrangement should be designed so that its cross-section can be deformed upon application of impact forces. In addition, in the preferred application of the invention, namely, in motor vehicles, it is necessary to convert the impact energy into deformation work to the greatest possible extent in a short deformation path. This is especially true when the transverse support arrangement is arranged along the side of a vehicle or is positioned as a knee bar in the knee room of the vehicle, since the space required for long deformation elements is not available in those cases.

A transverse support arrangement of this type is disclosed in U.S. Pat. No. 4,893,834 in the form of a knee bar having two adjacent transverse support sections, the first of which has a closed rectangular cross-section and the second having an essentially open semicircular cross-section which is attached to the body of the automobile by flanges at the open side of its cross-section. Because of the continuous curvature of the cross-section of the second section, the latter forms a linear support, extending parallel to the longitudinal direction of the first support section, and providing a support surface for the closed rectangular first support section. The first support section has a very rigid design in comparison to the second support section since it is intended to distribute the locally concentrated compressive forces produced by impact of the knee of a passenger in the vehicle as a result of a collision over as large a longitudinal portion of the second support section as possible. Because the width of the first support section is less than that of the second support section, deformation of the second support section takes place essentially by reverse deformation of the side walls of that section in such a way that the first section is pressed into the body of the second section.

This conventional transverse support arrangement has several disadvantages. For one thing, the use of a second support section having an open cross-section with flanges requires the presence of parts on the automobile body to which the flanges of the second support section are attached and, accordingly, necessitates appropriate design of these body parts. Secondly, the manufacture of this conventional transverse support arrangement is exceptionally cumbersome and costly since the two support sections are made in separate operations and are then joined together by screws. These screw connections require the second support section to have an open cross-section since otherwise it would hardly be possible to provide the screw connections.

SUMMARY OF THE INVENTION

Accordingly, it is an object of the present invention to provide a shock-absorbing transverse support arrangement which overcomes the above-mentioned disadvantages of the prior art.

Another object of the invention is to provide a shock-absorbing transverse support arrangement which is self-enclosed so that it need only be properly supported in its application in motor vehicles and which can be produced by a simple mass-production method, while preserving the advantages of the prior art arrangement.

These and other objects of the invention are attained by providing a transverse support arrangement having two sections formed with a common wall and having closed cross-sectional configurations, with one of the sections having a width greater than that of the other section, the structure being produced by a one-piece extrusion.

An essential concept of the invention is that the transverse support arrangement can be produced as a homogeneous part by extrusion, so that the transverse support arrangement constitutes a strip which only needs to be cut to the length required for its specific application. This advantageous production possibility is not obtained at the expense of properties important for the absorption of impact forces or of possibilities for variation in the structure of the transverse support arrangement because the properties of rigidity which are advantageous for useful conversion of kinetic energy into deformation work may be imparted to the individual walls of the transverse support arrangement in the extrusion. This means that short peaks ("spikes") of force in the force-distance diagram or in the force-time diagram are prevented and, instead of this, a fairly large region having an approximately constant force gradient is provided.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
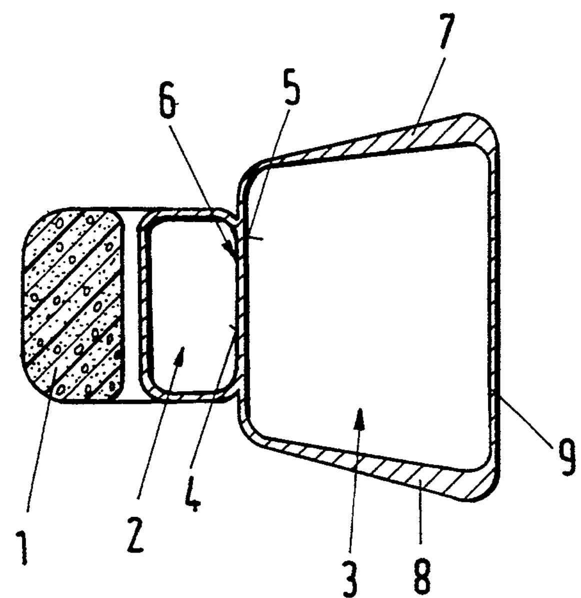
FIG. 1 is a cross-sectional view illustrating a representative impact-absorbing transverse support arrangement according to the invention, designed in the form of a knee bar.

Referring first to the typical embodiment shown in FIG. 1, a foam pillow 1 is mounted in front of a first support section 2 which, in turn, is disposed in front of a second support section 3 in the direction of an impact force, for example, in the direction of a passenger's knee moving forward in case of collision of the vehicle. In this case, the second support section 3 is supported on at least the A columns of the vehicle. The first support section 2 has a rectangular cross-section of greater width (i.e., height when disposed horizontally) than depth, and a rectangular cross-section is likewise provided for the second support section 3. Thus, the second section also has a closed and hence sturdy cross-section. Two surfaces 4 and 5 of the two sections 2 and 3, respectively, which are on opposite sides of a common wall 6, have a different height. In addition, the connecting walls 7 and 8 of the second support section 3 are oppositely inclined to form a trapezoid so that the height of the second support section 3 increases with increasing distance from the common wall 6. In addition, the thickness of the two walls 7 and 8 increases continuously in that direction. If desired, the rigidity of the support arrangement in the longitudinal direction may be made discontinuous by providing recesses and-/or foam fillings.

The entire transverse support arrangement consisting of the integral support sections 2 and 3 constitutes a one-piece double-chamber extrusion support section which is supplied as a strip.

Preferably, the transverse support is made of aluminum, but the use of synthetic material with reinforcements of metal or fiber composite is alternatively possible, especially for the walls 7 and 8.

Figure 2:
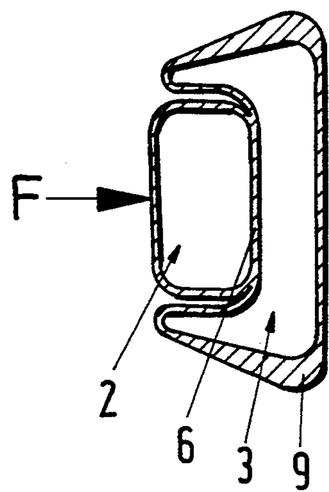
FIG. 2 is a cross-sectional view of a portion of the embodiment shown in FIG. 1 following deformation as a result of an impact.

Referring to FIG. 2, if an impact force F of predetermined minimum intensity occurs, the cross-sectional shape of the first support section 2 is at least initially maintained and that section is forced into the second section 3. This produces a reverse deformation of the second section in the sense that the common wall 6 of the two sections 2 and 3 is moved into the second section 3. This reverse deformation is completed when the common wall 6 engages the wall 9, at the right in the figures, of the second section 3. An additional conversion of energy may take place during a final phase of deformation of the second section 3, or subsequent thereto, by deformation of the first section 2, so that practically the entire original dimension of the transverse support sections 2 and 3 in the direction of impact F is utilized as a deformation distance.

As a general principle, a plurality of the support sections may alternatively be combined behind one another in the direction of impact and/or, with reference to the illustration of FIG. 1, in front of one another in an extruded impact-absorbing section.

Accordingly, the invention provides a transverse support arrangement which may be produced very simply and which has optimum properties with respect to the absorption of impact stresses.

Although the invention has been described herein with reference to specific embodiments, many modifications and variations therein will readily occur to those skilled in the art. Accordingly, all such variations and modifications are included within the intended scope of the invention.

We claim:

1. A transverse impact-absorbing support arrangement comprising at least two, first and second, support sections extending parallel to each other in the longitudinal direction of the support arrangement, the first support section being disposed in front of the second support section in the direction of application of an impact force, the first support section having a closed quadrangular cross-section and a common wall with the second support section, the common wall having two surfaces, one surface in the one of the first and second support sections having a dimension in the direction transverse to the longitudinal direction of the support arrangement and to the direction of application of impact force, which dimension is greater than and extends at both ends beyond the outer dimension of the other surface of the common wall in the other support section in the same direction, the second support section also having a closed cross-section, the two support sections constituting a one-piece extrusion structure.

2. A transverse support arrangement comprising at least two, first and second, support sections extending parallel to each other in the longitudinal direction of the support arrangement, the first support section being disposed in front of the second support section in the direction of application of an impact force, the first support section having a closed quadrangular cross-section and a common wall with the second support section, the common wall having two surfaces, one surface in the one of the first and second support sections having a dimension in the direction transverse to the longitudinal direction of the support arrangement and to the direction of application of impact force, which dimension is greater than the outer dimension of the other surface of the common wall in the other support section in the same direction, the second support section also having a closed cross-section, the two support sections constituting a one-piece extrusion structure, wherein the first support section is more resistant to transverse deformation than the second support section so that the first section produces reverse deformation of the second section by an impact force.

3. A transverse support arrangement according to claim 1 wherein the second support section has a trapezoidal form with increasing width in the direction away from the common wall.

4. A transverse support arrangement according to claim 3 wherein the walls in the second support section extending away from the common wall in the direction of the impact force have varying wall thickness in the direction of application of an impact force.

5. A transverse support arrangement according to claim 4 wherein the wall thickness of the walls in the second support section extending away from the common wall increases continuously with increasing distance from the common wall.

* * * * *